(12) United States Patent
Osawa

(10) Patent No.: US 7,296,286 B2
(45) Date of Patent: Nov. 13, 2007

(54) METHOD AND APPARATUS FOR TRANSMITTING IMAGE SIGNALS OF IMAGES HAVING DIFFERENT EXPOSURE TIMES VIA A SIGNAL TRANSMISSION PATH, METHOD AND APPARATUS FOR RECEIVING THEREOF, AND METHOD AND SYSTEM FOR TRANSMITTING AND RECEIVING THEREOF

(75) Inventor: Tomoya Osawa, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1071 days.

(21) Appl. No.: 10/353,949

(22) Filed: Jan. 30, 2003

(65) Prior Publication Data

US 2003/0142745 A1 Jul. 31, 2003

(30) Foreign Application Priority Data

Jan. 31, 2002 (JP) .............................. 2002-022670

(51) Int. Cl.
*H04N 7/173* (2006.01)
*H04N 7/18* (2006.01)

(52) U.S. Cl. ..................................... 725/105; 348/143

(58) Field of Classification Search ........... 348/211.12, 348/211.14, 231.6
See application file for complete search history.

(56) References Cited

U.S. PATENT DOCUMENTS 6,400,392 B1 * 6/2002 Yamaguchi et al. ..... 348/14.12
6,445,418 B1 * 9/2002 Oh et al. ................ 375/240.01
6,825,884 B1 * 11/2004 Horiuchi .................... 348/362
6,834,130 B1 * 12/2004 Niikawa et al. ......... 348/231.2
7,079,177 B2 * 7/2006 Okazaki et al. ........ 348/211.12

FOREIGN PATENT DOCUMENTS

| JP | 200050151 | 2/2000 |
|---|---|---|
| JP | 2000-350220 | 12/2000 |
| JP | 2001-94870 | 4/2001 |
| JP | 2001-94871 | 4/2001 |
| JP | 2001-94872 | 4/2001 |
| JP | 2001-94999 | 4/2001 |
| JP | 2001333421 | 11/2001 |
| JP | 2001352486 | 12/2001 |

\* cited by examiner

*Primary Examiner*—David Ometz
*Assistant Examiner*—Luong T. Nguyen
(74) *Attorney, Agent, or Firm*—Mattingly, Stanger, Malur & Brundidge, P.C.

(57) ABSTRACT

A system for transmitting and receiving an image signal has transmission apparatuses and reception apparatuses. Each of the transmission apparatuses includes an image pickup device for alternately outputting first and second image signals obtained by picking up images of a subject with different exposure times, a compressor for separately compressing data amounts of the first and second image signals, and a transmission interface for attaching an identification signal for identification of a transmitter and a frame number to each of compressed first and second image signals and transmitting attached compressed signals to a signal path. Each of the reception apparatuses includes a reception interface for receiving from the signal path the compressed image signals, an expander for individually expanding the received compressed image signals to reproduce the first and second image signals, and a combiner for combining reproduced first and second image signals at a desired combination ratio.

24 Claims, 4 Drawing Sheets

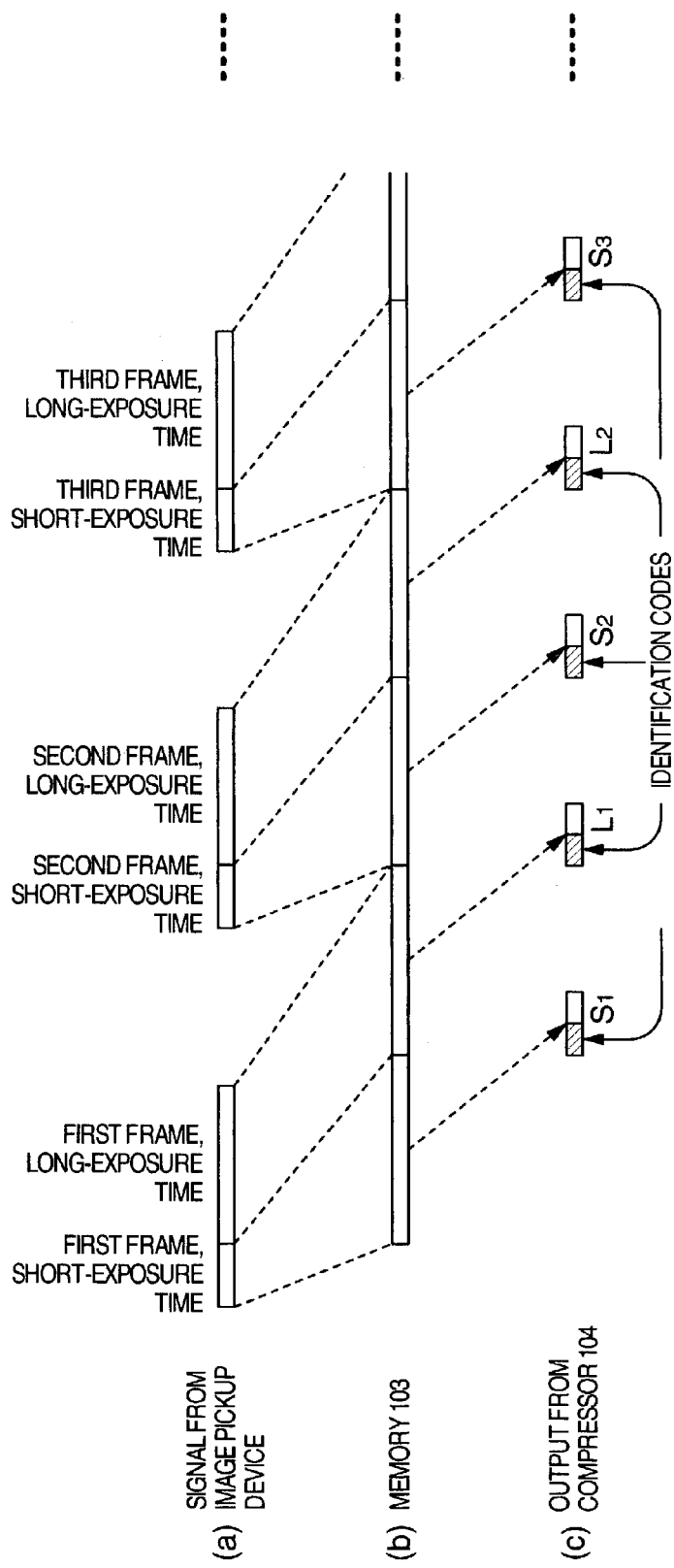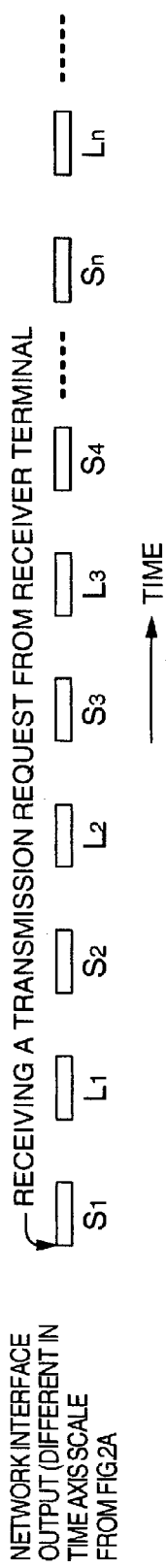

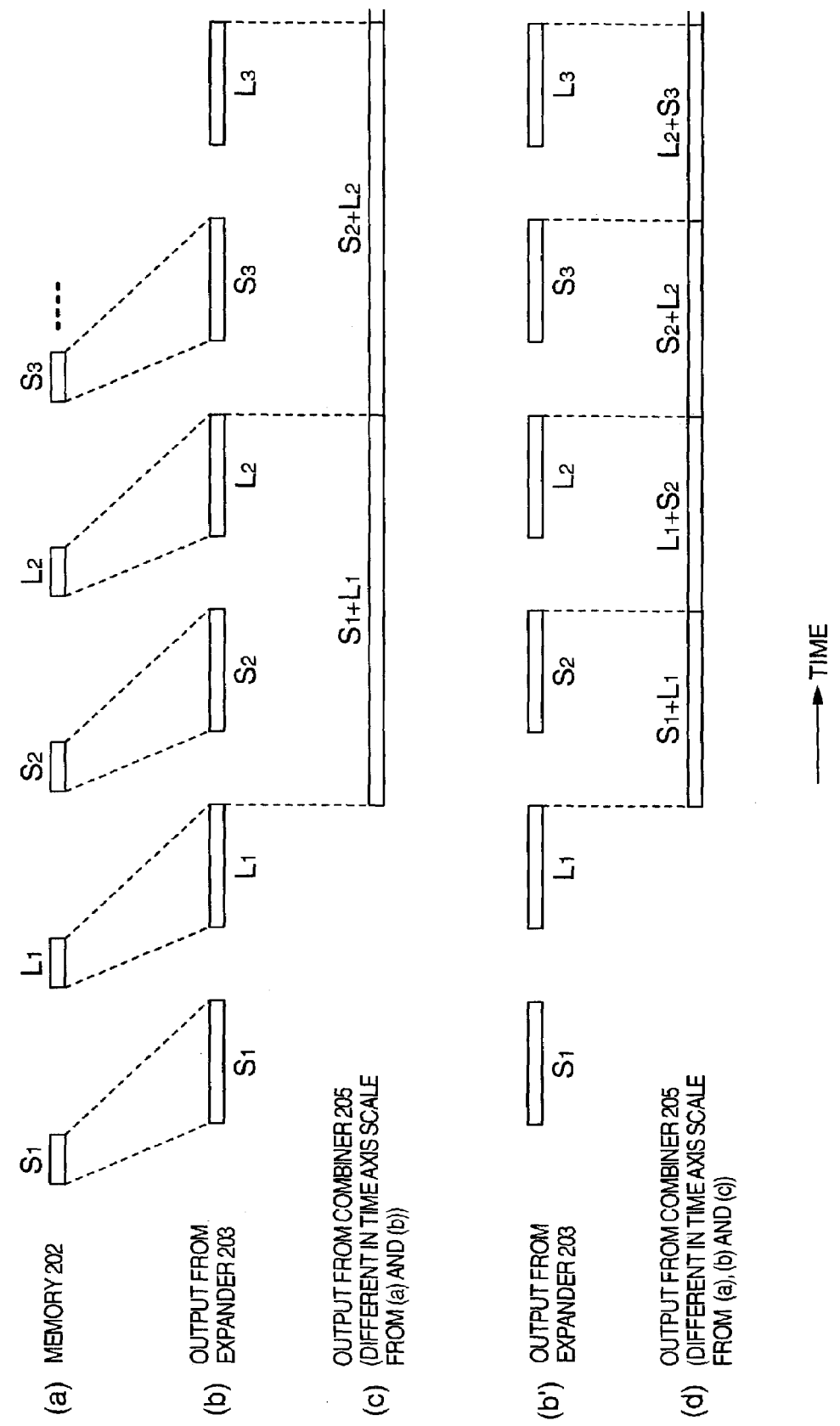

METHOD AND APPARATUS FOR TRANSMITTING IMAGE SIGNALS OF IMAGES HAVING DIFFERENT EXPOSURE TIMES VIA A SIGNAL TRANSMISSION PATH, METHOD AND APPARATUS FOR RECEIVING THEREOF, AND METHOD AND SYSTEM FOR TRANSMITTING AND RECEIVING THEREOF

CROSS-REFERENCE TO RELATED APPLICATION

The present application relates to subject matters described in co-pending patent application Ser. No. 09/588,078 filed on Jun. 6, 2000 assigned to the assignee of the present application and entitled "TELEVISION SIGNAL PROCESSOR FOR GENERATIGN VIDEO SIGNAL OF WIDE DYNAMIC RANGE, TELEVISION CAMERA USING THE SAME, AND METHOD FOR TELEVISION SIGNAL PROCESSING"

BACKGROUND OF THE INVENTION

Such an imaging apparatus that can pick up even a subject having highly bright and dark mixed images has been developed. Such an imaging apparatus can output both of an image signal taking in a long exposure time (hereinafter referred to as a long-exposure image signal) and an image signal taking in a short exposure time (hereinafter referred to as short-exposure image signal) for each subject. A clear image for a dark region of the subject is obtained from the image signal having the long exposure time, while a clear image for a bright region of the subject is obtained from the image signal having the short exposure time.

A conventional imaging apparatus such as a television camera having the aforementioned image pickup element having a wide dynamic range combines the aforementioned long and short exposure time image signals at a predetermined ratio therebetween into a combined image signal in a television camera itself, and outputs the combined image signal therefrom. Not only a clear image for the dark region of the subject but also a clear image for the bright region thereof can be obtained from the combined image signal. Hereinafter, aforementioned imaging apparatus outputting the long and short exposure time image signals is referred to as a wide dynamic range television camera.

Such kind of wide dynamic range television camera is disclosed, for example, in JP-2001-094870A, JP-2001-094999A, JP-2000-350220A, JP-2001-094871A or JP2001-094872A.

In the related television camera having a wide dynamic range, since the camera itself includes a complicated image combination circuit, the size of the camera becomes large, the consumption power thereof is increased, and the cost thereof is increased. When this camera is used as a camera for an image monitoring system or a surveillance system, the above characteristics become disadvantageous.

Those Japanese documents disclose that a wide dynamic range imaging element is used for the wide dynamic range television camera. However, the long- and short-exposure image signals may also be obtained in each frame by using an ordinary imaging device such as a CCD (Charge-Coupled Device) without using the wide dynamic range imaging element. For example, the long-exposure image signal is produced by transferring charges stored in each pixel of the ordinary imaging element in a normal exposure time (e.g. a time period for one vertical synchronizing period except for a blanking signal time), and while the short-exposure image signal is produced by such that the stored charge is wasted halfway in a normal exposure time and the charge stored in the rest of exposure time is transferred by using an electronic shutter facility of the imaging element. The effective exposure time is arbitrarily varied by the electronic shutter facility.

Further, the related television camera having a wide dynamic range combines the image signals having long and short exposure times at a predetermined fixed combination ratio therebetween into a combined signal and outputs the combined signal. However, a monitor device side for receiving such a combined signal cannot separate the image signals having the long and short exposure times. When the combined image signal is transmitted from the related television camera via a communication network to a plurality of image monitor devices, all of the monitor devices have to receive the same combined signal at the same combination ratio, which results in that combined images to be displayed on individual monitor displays of the monitor devices become the same. For this reason, the related television camera having a wide dynamic range cannot meet such demands of the individual image monitor devices that one of the monitor devices wants to display the dark region of the subject more clearly or another of the devices wants to display the bright region of the subject more clearly.

SUMMARY OF THE INVENTION

It is therefore an object of the present invention to provide an apparatus and method for transmitting and receiving an image signal having a wide dynamic range, which can eliminate disadvantage in the above prior art and can use a camera having its own reduced cost, size and power consumption, as well as an image monitoring system thereof.

An another object of the present invention is to provide an apparatus and method for transmitting and receiving an image signal having a wide dynamic range, which can realize such a high degree of combining operation that is impossible to be realized in the interior of the camera on its receiver terminal side, as well as an image monitoring system thereof.

A further object of the present invention is to provide an apparatus and method for transmitting and receiving an image signal having a wide dynamic range, which can eliminate disadvantage in the above prior art and can display images at individual different combination ratios in respective receiver terminals, as well as an image monitoring system thereof.

In accordance with an aspect of the present invention, the above objects are attained by providing a system for transmitting and receiving an image signal wherein a transmitter and a receiver are connected by a signal path. The transmitter has an image pickup device for outputting first and second image signals obtained by picking up a subject with different exposure times, a compressor for individually compressing the amounts of data of the first and second image signals, and a transmission interface for attaching signals indicative of identification of their transmitter and frame number to the compressed signals of the first and second image signals and transmitting the compressed signals attached with the identification to the signal path. The receiver has a reception interface for receiving the compressed image signal from the signal path, an expander for expanding the received compressed image signals respectively separately to reproduce the first and second image signals, and a combiner for combining the reproduced first and second image signals at a given combination ratio.

In the above aspect of the present invention, the combiner or a step of combining the image signals is located on the side of the receiver for receiving and displaying the image signals for observation. Accordingly, the television camera can be made compact and low in power consumption and cost. Further, the receiver side can combine image signals having long and short exposure times at a predetermined ratio which an user wants to and output a combined image signal. Therefore, when the invention is employed in image monitoring devices, the invention can meet individual demands in the respective image monitor devices including a desire to see a dark part of the subject more clearly or a desired to observe a bright part of the subject more clearly, thus improving it's usability.

Other objects, features and advantages of the invention will become apparent from the following description of the embodiments of the invention taken in conjunction with the accompanying drawings.

BRIEF DESCRIPTION OF THE DRAWINGS

FIGS. 2A and 2B show signal timing charts for explaining the operation of a surveillance (monitor) camera (transmitter side) in the image monitoring system of FIG. 1;

FIG. 3 is a signal timing chart for explaining the operation of a receiver terminal in the image monitoring system of FIG. 1.

DESCRIPTION OF THE EMBODIMENTS

Figure 1:
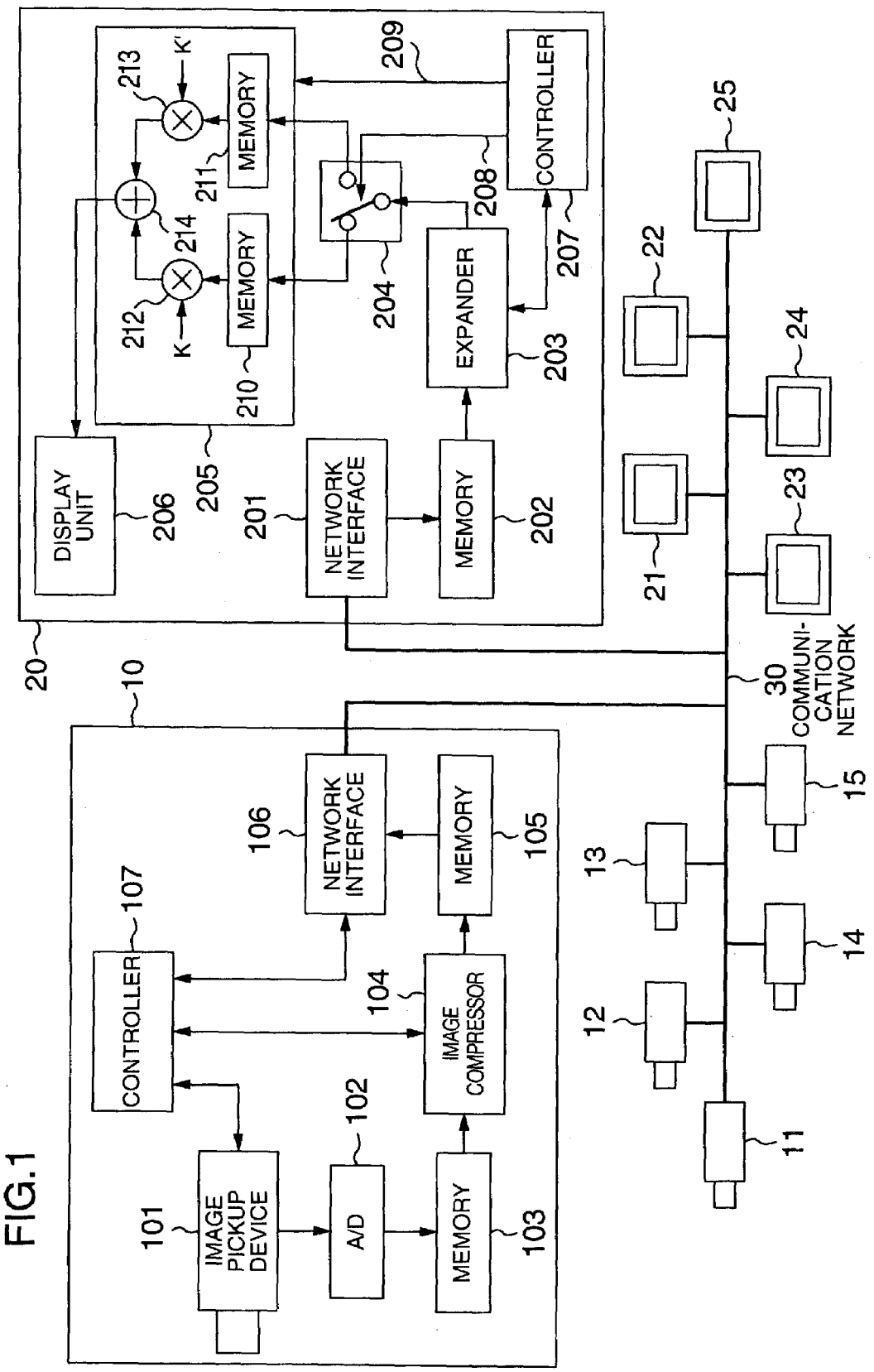
FIG. 1 shows a block diagram of an image monitoring system to which the present invention is applied.

FIG. 1 shows a block diagram of an embodiment of an image monitoring system utilizing a communication network using a wide dynamic range imaging element according to the present invention. In the drawing, reference numerals 10, 11, 12, 13, 14 and 15 denote surveillance cameras, any of which has the same interior structure as shown by a block 10. Numerals 20, 21, 22, 23, 24 and 25 denote receiver terminals, any of which has the same interior structure as shown by a block 20. The plurality of surveillance cameras 10 to 15 and the plurality of receiver terminals 20 to 25 are connected each other via a communication network 30 such as, e.g., the Internet. An image signal having a long exposure time and an image signal having a short exposure time obtained by picking up a subject with use of any of the surveillance cameras 10 to 15 are transmitted to at least one of the receiver terminals 20 to 25 via the communication network 30.

An embodiment will be explained in connection with a case where, as an example, image signal transmission is carried out between the surveillance camera 10 and receiver terminal 20. The function and operation of the other surveillance cameras 11 to 15 and other receiver terminals 21 to 25 are similar to those of the embodiment to be explained. In the present invention, the numbers of surveillance cameras and receiver terminals to be connected to the communication network 30 may be arbitrary. Further, the communication network 30 may be of any of wired any wireless types, for example a Local Area Network, xDSL (xDigital Subscriber Line), a CATV internet, the third generation mobile telecommunication network, or other type of signal transmission paths each of which has a different transmission rate in transmission signal.

The surveillance camera 10 shown in FIG. 1 has an image pickup device 101 having a wide dynamic range described above and including an optical system for guiding light from a subject to be picked up, an A-D converter circuit 102 for converting an analog image signal received from the image pickup device 101 into a digital signal, a memory 103 for storing a digital image signal corresponding to one frame from the A-D converter circuit 102, an image compressor 104 such as a JPEG encoder for compressing the digital image signal read out from the memory 103, a memory 105 for storing the compressed image signal from the image compressor 104, a network interface 106 for processing the image signal read out from the memory 105 so as to conform to the communication protocol of the communication network 30, e.g., to TCP/IP and outputting the processed image signal onto the communication network 30, a controller 107 such as, e.g., a microprocessor for controlling the interior of the surveillance camera 10, that is, controlling the image pick-up device 101 so as to output the long and short exposure time image signals, controlling the image compressor 104 for compressing the digital image signal at a predetermined compression rate according to the transmission rate of the communication network 30, for example, and adding identification signals to the compressed digital image signals. In this connection, the network interface 106, which can communicate in two ways, can also receive a signal from the communication network 30 in such a manner that the controller 107 controls the operation of the surveillance camera 10 in response to the received signal.

The receiver terminal 20 has a network interface 201 for receiving a signal from the communication network 30, converting the received signal into a signal of a type which can be processed within the receiver terminal 20, and outputting the converted signal; a memory 202 for storing the signal from the network interface 201; an expander 203 such as a JPEG decoder for expanding signal data read out from the memory 202; a selector 204 for sorting image signals having long and short exposure times according to a selection signal 208 and outputting the respective signals to a combiner 205, the combiner functioning to combine the both signals having the long and short exposure times at combination ratios set for the respective signals; a display unit 206 for receiving the combined image signal from the combiner 205 and displaying it thereon; and a controller 207 such as, e.g., a microprocessor for controlling the expander 203 so as to expand the signal data, detecting the identification signals to distinct the long and short exposure time image signals, and generating a selection signal 208 and a set signal 209 for setting after-mentioned combination ratios K and K', or controlling the interior of the receiver terminal 20.

The combiner 205 includes memories 210 and 211 for storing the image signals having the long and short exposure times from the selector 204 respectively, multipliers 212 and 213 for multiplying signals read out from the memories 210 and 211 by combination ratios K and K' respectively, and an adder 214 for adding the signals multiplied by the combination ratios together and outputting the multiplied signal.

In order for speeding up of the signal processing, two memory groups of the memories 210 and 211 may be provided. When one group of memories 210 and 211 is in data-reading operation, the other group of memories 210 and 211 performs data-writing operation.

In this connection, the network interface 201, which can communicate in two ways, can also output the signal received from the surveillance camera 10 to the communication network 30.

Detailed explanation will be made as to the operation of the surveillance camera 10 by referring to a signal timing chart of FIGS. 2A and 2B. In the image pickup device 101 such as a CCD device, imaging operations in a long exposure time (such as 1/60 sec.) and a short exposure time (such as 1/100 sec.) are alternately made and the long-and short-exposure image signals are outputted on one-frame image basis alternately as shown in FIG. 2A, (a). At this point, one frame image is outputted in 1/30 seconds, for example. The long-exposure image signal and the short-exposure image signal are converted into digital image signals by the A-D converter circuit 102. And the digital image signals corresponding to each one frame are stored in the memory 103 as shown in FIG. 2A, (b). The long-exposure digital image signal and short-exposure digital image signal read out from the memory 103 are compressed by the image compressor 104 into image signals having a compression ratio corresponding to about 1/10 times the original data amount respectively. In FIG. 2A, (c) and FIG. 2B, a frame image signal of the long-exposure image signal is denoted by Ln (n being an integer shown by a frame number such as 1, 2, 3, ... n), and a frame image signal of the short-exposure image signal is denoted by Sn. The value of the compression ratio may be selected arbitrarily, and depend on the signal transmission rate of the network 30 in general. At this time, an identification signal is attached to the compressed long-exposure image signal $L_1, L_2, L_3, \ldots, L_n$ and short-exposure image signal $S_1, S_2, S_3, \ldots, S_n$. The identification signal further includes information (IP address) for identifying the surveillance camera 10 and information for discriminating between the long-exposure and short-exposure image signals, that is, indicative of a frame number (serial number) or the like. The identification signal can be generated by the controller 107 in synchronization with the switching operation for long and short exposure imagings in the image pickup device 101. The compressed image signal from the image compressor 104 is once stored in the memory 105. The memory 105 has a capacity storing for 30 frames image data for each of long-exposure image signal and short-exposure image signal, and updates the image signal data by overwriting new data on the earliest data having been stored in the memory. When the memory 105 receives a transmission request from one of the receiver terminals 20-25, the compressed long-exposure and short-exposure image signals attached by the identification signal read out via the memory 105 at a predetermined read timing are alternately output via the network interface 106 onto the communication network 30 based on the communication protocol of the network as shown in FIG. 2B.

Next detailed explanation will be made as to the operation of the receiver terminal 20 with reference to a signal timing chart of FIG. 3. The network interface 201 receives the alternately-continuous compressed signal of the long- and short-exposure image signals from the surveillance camera 10 via the communication network 30. The compressed signal of the long- and short-exposure image signals is once stored in the memory 202. The expander 203 expands the signal read out from the memory 202 to reproduce the original long- and short-exposure image signals. The controller 207, on the basis of the identification signal detected by the expander 203, generate the selection signal 208 for discriminating between the long- and short-exposure image signals. The selector 204, in response to the selection signal 208, sorts the received signal into the long- and short-exposure image signals and stores the signals in the respective memories 210 and 211. The combiner 205 multiplies the long- and short-exposure image signals read out from the memories 210 and 211 by the set combination ratios K and K' and adds the long- and short-exposure image signals multiplied by the combination ratios together. The combination ratios of the long- and short-exposure image signals can be arbitrarily set according to the set signal 209 from the controller 207. For example, when no instruction of a setting change from the controller 207 is particularly present, the controller 207 is operated with initial values (default values), that is, with a ratio K of the long-exposure image signal of 0.5 and a ratio K' of the short-exposure image signal of 0.5. When the user instructs the controller 207 to change the setting while watching the received image on the display unit 206, then the controller 207 may give the signal 209 to the combiner 205 to instruct it to change the values the combination ratios K and K' (K+K'=1) to specified values. The display unit 206 receives the compressed image signal from the combiner 205 and displays it in the form of an image.

In this way, the long- and short-exposure image signals received at the receiver terminal 20 can be combined at a desired combination ratio and output. Thus, when the user wants to see the dark part of the subject more clearly, the user sets the ratio K of the long-exposure image signal larger; while, when the user wants to observe the bright part of the subject more clearly, the user can set the ratio K' of the short-exposure image signal larger. Accordingly, depending on the region or target to be monitored, the system can meet individual requests on the respective receiver terminals 20 to 25 and can improve in its usability as a monitoring system.

Further, the receiver terminal 20 can select any of the surveillance cameras 10 to 15 and can see its image. In this case, identification information on the surveillance camera specified by the user, that is, an IP address and an image signal request are given to the network interface 201, transmitted to the specified surveillance camera via the communication network 30, so that the surveillance camera when receiving the request signal can also transmit the long- and short-exposure image signals to the receiver terminal 20 as the request originator.

Explanation will now be made as to how to read out the long- and short-exposure image signals from the memories 210 and 211, by referring to FIGS. 3(b)-(c) and 3(b')-(d). In FIG. 3, the same signal chart is shown in (b) and (b') to help for easy understanding of the signal processing from (b) to (c) and from (b') to (d). In FIGS. 3, (c) and (d), a frame image signal of the long-exposure image signal is denoted by Ln (n being an integer shown by a frame number such as 1, 2, 3, ... n), and a frame image signal of the short-exposure image signal is denoted by Sn.

In the combination based on how to read out in FIG. 3, (c), the combiner 205 combines the same frame numbers Ln and Sn read out from the memories 210 and 211 and outputs the combined result.

In the combination based on how to read out in FIG. 3, (d), the combiner 205 combines frame image signals Ln−1 and Sn read out from the memories 210 and 211, combines frame image signals Sn and Ln in the next, combines frame image signals Ln and Sn+1 in the next, and sequentially output them. That is, upon reading out, it is always required to continuously read out the same frame of each of the long- and short-exposure image signals Ln and Sn twice alternately. A frame rate in the case of the combination of FIG.

3, (d) is twice a frame rate in the combination of FIG. 3, (c) and is the same frame rate as the original image signal on the surveillance camera side. As a result, motion in the displayed moving image in FIG. 3, (d) is made smoother as compared with FIG. 3, (c). In the method of data reading shown in FIG. 3, (d), the output frame length is set to a half reading-out speed in the method shown in FIG. 3, (c).

Figure 4:
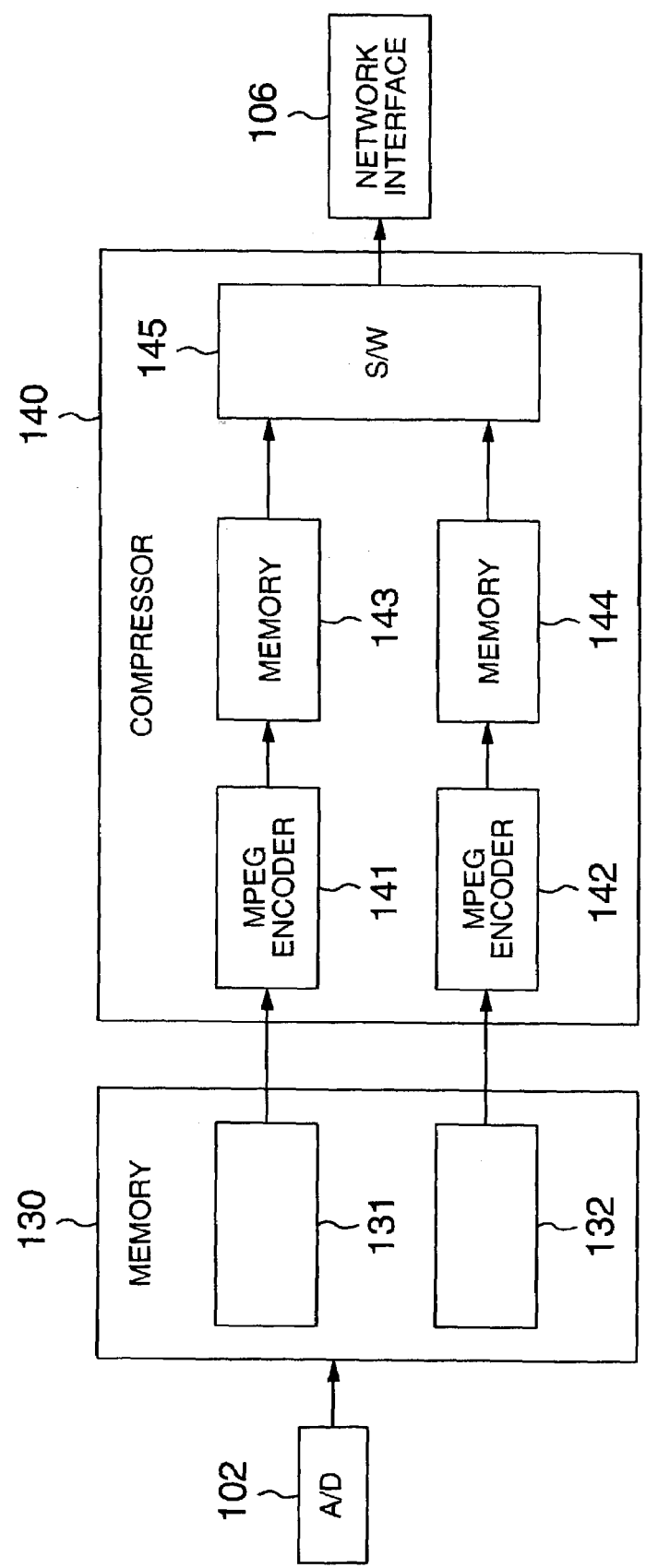
FIG. 4 is a block diagram of an embodiment of the surveillance camera when an image signal of an MPEG type is applied to the system of the present invention.

The above embodiment has been explained in connection with the example where signal compression and expansion are carried out on the JPEG basis, but the invention of this application can be applied also to MPEG method. FIG. 4 shows a structure of a compressor 140 in a surveillance camera for transmitting an image of an MPEG type. Since this surveillance camera is fundamentally the same as the surveillance camera 10 in FIG. 1 except for the compressor 140 and a memory 130, the camera is not illustrated. Long- and short-exposure image signals from the A-D converter circuit 102 are stored separately into memory areas 131 and 132 of the memory 130. The MPEG image signal includes I-picture (Inter Picture), P-picture (Predictive Picture), and B-picture (Bidirectionary Predictive Picture). The I-picture is produced by encoding based on the frame data itself. The P-picture is produced by encoding based on the difference between the present and the previous frame data, and the B-picture is produced by encoding based on the difference among some frames in the vicinity of each other. Since such MPEG image signal includes information across a plurality of frames, processing cannot be carried out on a frame basis. For this reason, it is required to compress the long- and short-exposure image signals separately. The compressor 140 has MPEG encoders 141 and 142 which separately compress the long- and short-exposure image signals. The compressed long- and short-exposure image signals are once stored in memories 143 and 144. And the compressed long- and short-exposure image signals are alternately read out from the memories 143 and 144 by a switch 145 and are given to the network interface 106. On the side of the receiver terminal, the compressed long- and short-exposure image signals are separated, individually expanded, and combined as in FIG. 1.

Incidentally, time delay in each unit is not included in the signals shown in the timing charts in FIGS. 2A, 2B and 3, but neglected.

Since the combining operation is carried out at the receiver terminals 20 to 25, the combining operation can be realized at ratios different in the receiver terminals based on the image of a single camera. For this reason, combined images required by the individual supervisors in the receiver terminals can be displayed.

Further, when such a personal computer that each user can separately set is used as each of the receiver terminals, such a high degree of combination that cannot be processed in the interior of the camera can be realized.

In accordance with the present invention, since the need for combining the long- and short-exposure image signals on the camera side can be eliminated, the cost, space and power consumption of the camera side can be reduced. In addition, since it is unnecessary for the camera side to have a function of transmitting a plurality of image information corresponding to a plurality of respective receiver terminals to the respective receiver terminals, the cost, space and power consumption of the camera side can be decreased.

The image of a single camera can be combined at ratios different in personal computers, and such fine setting of a combination ratio that a supervisor can easily observe a desired part more clearly can be realized.

It should be further understood by those skilled in the art that the foregoing description has been made on embodiments of the invention and that various changes and modifications may be made in the invention without departing from the spirit of the invention and the scope of the appended claims.

What is claimed is:

1. A receiving apparatus for receiving image signals having a first and a second image signals obtained by picking-up an image of a subject with different exposure times, said first and second image signals being compressed at data amounts, each of which has an identification signal, respectively, comprising:
    a reception interface coupled with a transmission line, for receiving said compressed first and second image signals;
    an expander coupled with said reception interface, for expanding said compressed first and second image signals, respectively, to said first and second image signals;
    a selector coupled with said expander, for selecting and outputting said expanded first and second image signals, respectively;
    a combiner for combining said expanded first and second image signals outputted from said selector at a predetermined combination ratio; and
    a second controller coupled with said expander, selector and combiner, for controlling said expander to detect said identification signals relating to said first and second image signals, respectively, for controlling the operation of said selector to select said expanded first and second image signals in response to said identification signals, and for controlling said combiner to combine said expanded first and second image signals.

2. A receiving apparatus according to claim 1, wherein said combiner comprises a first and a second memory devices, a variable controller coupled to said first and second memory devices, for changing a combination ratio between said first and second image signals, and an adder, said first and second memory devices store said first and second image signals, respectively, and said first and second image signals are combined at said adder in accordance with said combination ratio.

3. A receiving apparatus according to claim 2, wherein said variable controller comprises two multipliers, each of which is coupled to said first and second memory devices, said two multipliers having coefficients K and K', respectively, a relationship between K and K' being K+K'=1.

4. A receiving apparatus according to claim 1, wherein said identification signals include identification of a transmitter to be transmitted said first and second image signals and a frame number for each of said first and second image signals, a first frame signal of said first image signal is denoted by Ln, n being an integer indicative of a frame number such as 1, 2, 3, . . . n, a second frame signal of said second image signal is denoted by Sn, said combiner, in turn, combines Ln−1 and Sn−1, combines Sn−1 and Ln, and combines Ln and Sn on the basis of said identification signals, and sequentially outputs combined signals.

5. A receiving apparatus according to claim 1, wherein said identification signals include identification of a transmitter to be transmitted said first and second image signals and a frame number for each of said first and second image signals, a first frame signal of said first image signal is denoted by Ln, n being an integer indicative of a frame number such as 1, 2, 3, . . . n, a second frame signal of said second image signal is denoted by Sn, said combiner combines Ln and Sn having an identical frame number on the basis of said identification signals, and outputs a combined signal.

6. An image signal transmission system comprising:
a transmitting apparatus and a receiving apparatus coupled with a transmission line therebetween, for transmitting image signals having a first and a second image signals obtained by picking-up an image of a subject with different exposure times,
wherein said transmitting apparatus comprising:
an image pick-up device for outputting said first and second image signals;
a compressor coupled with said image pick-up device, for compressing data amounts of said first and second image signals, respectively;
a transmission interface coupled with said compressor, for transmitting said compressed first and second image signals, respectively, to said transmission line; and
a first controller coupled with said image pick-up device and said compressor, for controlling said image pick-up device so as to outputting said first and second image signals and for adding identification signals to said compressed first and second image signals for identifying said compressed first and second image signals transmitted to said transmission line; and
said receiving apparatus comprising:
a reception interface coupled with said transmission line, for receiving said compressed first and second image signals;
an expander coupled with said reception interface, for expanding said compressed first and second image signals, respectively, to said first and second image signals;
a selector coupled with said expander, for selecting and outputting said expanded first and second image signals, respectively;
a combiner for combining said expanded first and second image signals outputted from said selector at a predetermined combination ratio; and
a second controller coupled with said expander, selector and combiner, for controlling said expander to detect said identification signals relating to said first and second image signals, respectively, for controlling the operation of said selector to select said expanded first and second image signals in response to said identification signals, and for controlling said combiner to combine said expanded first and second image signals.

7. An image signal transmission system according to claim 6, further comprising:
a plurality of said transmitting apparatuses, each of which has said image pick-up device having identification and a plurality of said receiving apparatuses coupled with said transmission line, when at least one of said receiving apparatuses outputs a request for transmitting said first and second image signals through said transmission line, one of said transmitting apparatuses corresponding to said request from one of said receiving apparatuses outputs said first and second image signals to said requested receiving apparatus.

8. An image signal transmission system according to claim 6, wherein said identification signals include identification of a transmitter to be transmitted said first and second image signals and a frame number for each of said first and second image signals, a first frame signal of said first image signal is denoted by Ln, n being an integer indicative of a frame number such as 1, 2, 3, ... n, a second frame signal of said second image signal is denoted by Sn, said combiner, in turn, combines Ln−1 and Sn−1, combines Sn−1 and Ln, and combines Ln and Sn on the basis of said identification signals, and sequentially outputs combined signals.

9. An image signal transmission system according to claim 6, wherein said identification signals include identification of a transmitter to be transmitted said first and second image signals and a frame number for each of said first and second image signals, a first frame signal of said first image signal is denoted by Ln, n being an integer indicative of a frame number such as 1, 2, 3, ... n, a second frame signal of said second image signal is denoted by Sn, said combiner combines Ln and Sn having an identical frame number on the basis of said identification signals, and outputs a combined signal.

10. An image signal transmission system according to claim 6, wherein a plurality of said receiving apparatuses have said combiners, respectively, each of which comprises said memory devices, a variable controller coupled to said memory device, for changing a combination ratio between said first and second image signals, and an adder, said memory devices store said first and second image signals, respectively, and said first and second image signals are combined at said adder in accordance with said combination ratio, and the respective variable controllers of a plurality of said receiving apparatuses operate so as to combine said first and second image signals at different combination ratio.

11. An image signal transmission system according to claim 6, wherein said transmission line is a communication network, said transmission interface and said reception interface transmits and receives a signal based on a communication protocol prescribed in said communication network.

12. An image signal transmission system according to claim 6, wherein said receiving apparatus further comprises a display device coupled to said combiner, for displaying a video signal combined said expanded first and second image signals.

13. A method of receiving image signals having a first and a second image signals obtained by picking-up an image of a subject with different exposure times, said first and second image signals being compressed at data amounts, each of which has an identification signal, respectively, comprising the steps of:
receiving said compressed first and second image signals;
expanding said compressed first and second image signals, respectively, to said first and second image signals;
detecting said identification signals relating to said first and second image signals, respectively,
selecting said expanded first and second image signals, respectively, in response to said identification signals; and
combining said expanded first and second image signals at a predetermined combination ratio.

14. A method of receiving image signals according to claim 13, wherein said step of combining said expanded first and second image signals at a predetermined combination ratio includes the steps of changing a combination ratio between said first and second image signals.

15. A method of receiving image signals according to claim 13, wherein said identification signals include identification of a transmitter to be transmitted said first and second image signals and a frame number for each of said first and second image signals, a first frame signal of said first image signal is denoted by Ln, n being an integer indicative of a frame number such as 1, 2, 3, ... n, a second frame signal of said second image signal is denoted by Sn, and said step of combining said expanded first and second image signals includes the steps of, in turn, combining Ln−1 and Sn−1, combining Sn−1 and Ln, and combining Ln and Sn on the basis of said identification signals, and sequentially outputting combined signals.

16. A method of receiving image signals according to claim 13, wherein said identification signals include identification of a transmitter to be transmitted said first and second image signals and a frame number for each of said first and second image signals, a first frame signal of said first image signal is denoted by Ln, n being an integer indicative of a frame number such as 1, 2, 3, . . . n, a second frame signal of said second image signal is denoted by Sn, and said step of combining said expanded first and second image signals includes the steps of combing Ln and Sn having an identical frame number on the basis of said identification signals, and outputting a combined signal.

17. A method of transmitting image signals in a transmission system comprising:
   an transmitting apparatus; and
   a receiving apparatus coupled with a transmission line therebetween, comprising the steps of:
   image picking-up a first and a second image signals obtained by picking-up an image of a subject with different exposure times;
   compressing data amounts of said first and second image signals, respectively;
   adding identification signals to said compressed first and second image signals, respectively, for identifying said compressed first and second image signals transmitted to said transmission line;
   transmitting said compressed first and second image signals attached said identification signals, respectively, to said transmission line;
   receiving said compressed first and second image signals;
   expanding said compressed first and second image signals; respectively, to said first and second image signals;
   detecting said identification signals relating to said first and second image signals, respectively;
   selecting said expanded first and second image signals, respectively, in response to said identification signals; and
   combining said expanded first and second image signals at a predetermined combination ratio.

18. A method of transmitting image signals in a transmission system according to claim 17, wherein said identification signals are frame numbers relating to said first and second image signals.

19. A method of transmitting image signals in a transmission system according to claim 17, further comprising the steps of:
   receiving a transmission signal from said transmission line in said transmitting apparatus and of controlling so as to change a compression rate of said first and second image signals in response to the transmission rate of said transmission line.

20. A method of transmitting image signals in a transmission system according to claim 17, wherein said step of combining said expanded first and second image signals at a predetermined combination ratio includes the steps of changing a combination ratio between said first and second image signals.

21. A method of transmitting image signals in a transmission system according to claim 17, wherein said identification signals include identification of said transmitting apparatus to be transmitted said first and second image signals and a frame number for each of said first and second image signals, a first frame signal of said first image signal is denoted by Ln, n being an integer indicative of a frame number such as 1, 2, 3, . . . n, a second frame signal of said second image signal is denoted by Sn, and said step of combining said expanded first and second image signals includes the steps of, in turn, combining Ln−1 and Sn−1, combining Sn−1 and Ln, and combining Ln and Sn on the basis of said identification signals, and sequentially outputting combined signals.

22. A method of transmitting image signals in a transmission system according to claim 17, wherein said identification signals include identification of said transmitting apparatus to be transmitted said first and second image signals and a frame number for each of said first and second image signals, a first frame signal of said first image signal is denoted by Ln, n being an integer indicative of a frame number such as 1, 2, 3, . . . n, a second frame signal of said second image signal is denoted by Sn, and said step of combining said expanded first and second image signals includes the steps of combing Ln and Sn having an identical frame number on the basis of said identification signals, and outputting a combined signal.

23. A method of transmitting image signals in a transmission system according to claim 17, wherein said transmission system further comprises:
   a plurality of transmitting apparatuses, each of which has said image pick-up device having identification and a plurality of receiving apparatuses coupled with said transmission line, and further comprises the steps of:
   outputting an request from at least one of said receiving apparatuses, for transmitting said first and second image signals through said transmission line and outputting said first and second image signals to said requested receiving apparatus.

24. A method of transmitting image signals in a transmission system according to claim 17, wherein said transmission line is a communication network, said transmitting apparatus and said receiving apparatus transmits and receives said image signals based on a communication protocol prescribed in said communication network.

* * * * *